Dec. 6, 1927.

B. E. GAGNON 1,652,112

COUPLING

Filed June 25, 1927

Inventor:
BERNARD E. GAGNON
By his Attorneys

Patented Dec. 6, 1927.

1,652,112

UNITED STATES PATENT OFFICE.

BERNARD E. GAGNON, OF BRIDGEPORT, CONNECTICUT, ASSIGNOR TO THE BEAD CHAIN MANUFACTURING COMPANY, OF BRIDGEPORT, CONNECTICUT, A CORPORATION OF CONNECTICUT.

COUPLING.

Application filed June 25, 1927. Serial No. 201,346.

My invention relates to couplings, and is particularly intended for use as a coupling between a bead chain and a jump ring.

In the accompanying drawings—

Figure 1:
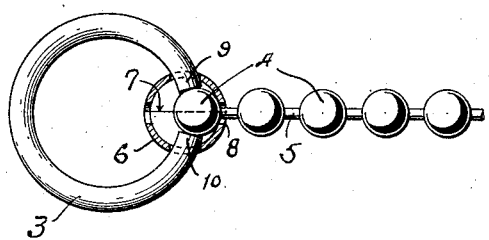
Figure 2:
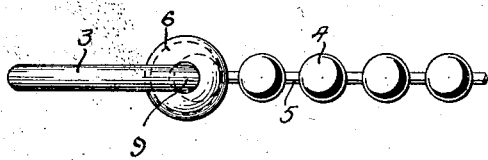

Fig. 1 is a side elevation of a coupling showing the coupling ball in section; and Fig. 2 is a side elevation at right angles to Fig. 1.

The present coupling device is shown connecting a split jump ring 3 with a bead chain of the type comprising balls 4 flexibly connected by dumbbell links 5. The coupling member is a ball 6 formed from flat sheet metal in same fashion as the balls of the bead chain, and in accordance with the teachings of the Goodridge & Gagnon Patent No. 1,087,876, February 17, 1914. Consequently it is split or seamed at 7. Its diameter, however, is substantially twice that of the chain balls. Its end aperture 8 accommodates the link which joins the end chain ball 4 to the adjacent ball of the chain. Diametrally located holes 9 and 10, on an axis at right angles to the plane of the split 7, accommodate the ends of the split ring 3.

The coupling is effected by closing the ball 6 upon the end ball 4 of the chain, with its link 5 passing out through hole 8. The split ring 3, which is of spring metal, is then opened sufficiently to permit the insertion of its spaced ends through the diametral holes 9 and 10 in the ball 6, whereupon the ring closes, by reason of its own resiliency or by applied pressure if necessary, upon the end ball 4 of the chain within the coupling ball 6. The chain ball prevents circumferential displacement of the ring 3 with respect to the coupling ball 6.

The coupling is simple and inexpensive, and provides a connection harmonious in appearance with the bead chain, and at the same time satisfactory.

I claim as my invention—

1. A jump ring coupling comprising a split, hollow, sheet metal ball engaged around the end ball of a bead chain, and apertured in the plane of the split to accommodate a chain link, and independently apertured at right angles to the axis of the split to accommodate the opposite ends of a split ring.

2. For use in a jump ring coupling, a split coupling ball adapted to embrace the end ball of a chain and apertured on an axis at right angles to the plane of the split to accommodate the ends of a split ring.

3. For use in a jump ring coupling, a split coupling ball apertured in the plane of the split to accommodate the link of a bead chain, and independently apertured at right angles to the plane of the split to accommodate the ends of a split coupling ring.

In testimony whereof I have signed my name to this specification.

BERNARD E. GAGNON.